Jan. 31, 1967   H. B. NEWCOMER   3,301,121
ANTI-WOBBLE ASSEMBLY
Filed March 4, 1965
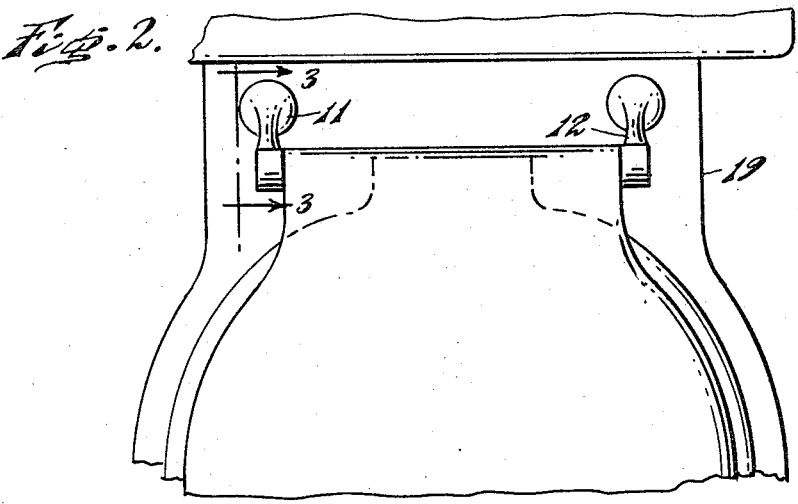
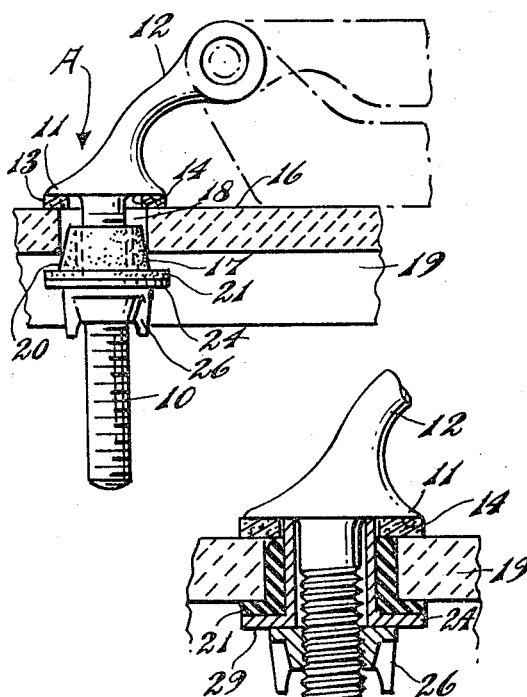
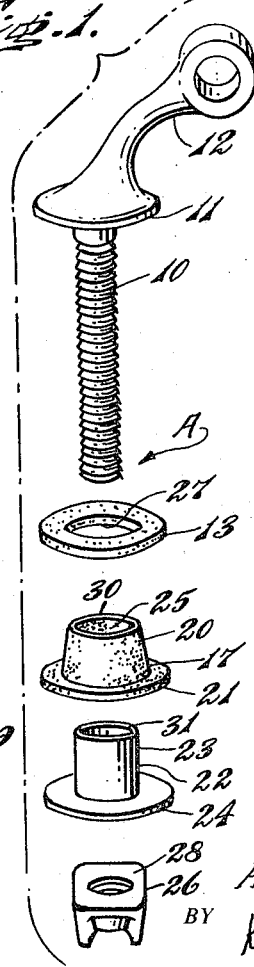
INVENTOR.
Harold B. Newcomer
BY Karl L. Spivak
ATTORNEY

United States Patent Office 3,301,121
Patented Jan. 31, 1967

3,301,121
ANTI-WOBBLE ASSEMBLY
Harold B. Newcomer, 4200 Aldine St.,
Philadelphia, Pa. 19136
Filed Mar. 4, 1965, Ser. No. 437,123
1 Claim. (Cl. 85—1)

This invention relates in general to mechanical fastening devices, and is more particularly directed to an assembly utilizing both metal and rubber members in close cooperation to provide a secure connection possessing both the advantage of the resiliency afforded by rubber and the firmness produced by metal.

In prior art assemblies of the type described, it is common practice to utilize a threaded shank to secure two non-resilient elements such as a vitrified china bowl and a metal hinge member. A rubber washer is commonly employed between the head of the shank and the top of the bowl and between a steel nut threadedly engaged upon the shank and the bottom of the bowl. In such a manner, by turning the nut upon the shank, the assembly may be readily secured in place by compressing the rubber washers between the metal parts. While initially such an arrangement is satisfactory, experience has shown that in a relatively short period of time, the assembly has a tendency to loosen due either to deterioration of the rubber washers or to permanent distortion of the washers caused by the metal to rubber contact. Once this occurs, the assembly wobbles in place, causing annoyance and inconvenience to the user until such time as the faulty washers are removed and replaced.

It is therefore an object of this invention to provide a threaded assembly of improved design featuring metal to metal contact at the bearing surfaces.

It is another object of this invention to provide an anti-wobble assembly incorporating both rubber and metal functioning elements in close cooperation with each other.

It is another object of this invention to provide an anti-wobble assembly of novel design featuring both internal and external metal bearing faces.

It is another object of this invention to provide an anti-wobble assembly of novel design incorporating resilient elements sandwiched between non-resilient retaining and bearing members.

It is another object of this invention to provide an anti-wobble assembly that is inexpensive in manufacture, simple in installation and trouble-free upon use.

Other objects and a fuller understanding of the invention will be had by referring to the following description and claim of a preferred embodiment thereof, taken in conjunction with the accompanying drawings wherein like reference characters refer to similar parts throughout the several views and in which:

FIG. 1 is an exploded view of the assembly showing one embodiment thereof.

FIG. 2 is a top plan view of the invention with the elements positioned in use.

FIG. 3 is a cross section taken along line 3—3 of FIG. 2 prior to tightening the elements in operating position.

FIG. 4 is an enlarged view of FIG. 3 with all functioning parts securely fastened in position.

Although specific terms are used in the following description for the sake of clarity, these terms are intended to refer only to the particular structure of my invention selected for illustration in the drawings and are not intended to define or limit the scope of the invention.

While in the embodiment shown, the invention is illustrated as applied to a water closet and seat, it will be appreciated that this application is shown for purposes of clarity only, and the principles demonstrated will be equally applicable whenever it is desired to threadedly join two non-resilient members, one being of non-metallic composition.

Referring now to FIG. 1, the assembly A comprises a threaded shank 10 which terminates upwardly in a concentric flange 11 which may be integrally formed with a bearing member 12 of finished metal in the application shown. A washer 13 of rubber or other resilient material rides upon the shank 10 and seats against the bottom 14 of the flange 11. As seen in FIGS. 3 and 4, the bottom 15 of the washer 13 rests upon the top surface 16 of a water closet 19 and insulates the shank flange 11 therefrom.

As indicated, a water closet 19 may be provided with a pair of seat attaching holes 18 each to downwardly receive a threaded shank 10. The resilient, hollow grommet 17 serves to concentrically position the shank 10 within the hole 18 and is provided with an upwardly extending, conical compression element 20 rising above an integrally formed flange element 21. A cooperating metal insert 22 comprising a hollow cylindrical sleeve 23 and a bottom connected extension flange 24 slides within the central opening 25 of the grommet 17 until the respective flanges 21, 24 abut. As best seen in FIG. 3, the overall height of the insert 22 is equal to the uncompressed overall height of the grommet 17 prior to installation as hereinafter more fully set forth. A conventional nut 26 threadedly turns upon the shank 10 to secure the assembly A in permanent engagement with the water closet 19.

Referring now to FIGS. 3 and 4, the cooperation and arrangement of the various parts of the assembly A in operating relationship may be observed. The washer 13 is first positioned above the water closet mounting hole 18 with its central opening 27 concentrically placed thereon. The threaded shank downwardly engages the washer 13 and the mounting hole 18 until the metal flange 11 contacts the resilient washer 13. The insert 22 upwardly penetrates the opening 25 provided in the grommet 17 until the respective flanges 21, 24 meet. The grommet and insert assembly thus formed, slips over the downwardly extending shank 10 and is positioned with the conical element 20 of the grommet 17 and the sleeve 23 of the insert 22 within the hole 18 while the conical configuration serves to concentrically position the shank 10 within the mounting hole 18. The nut 26 threadedly engages the shank 10 and serves to secure the assembly in place upon being tightened.

As best seen in FIG. 4, the metal top 28 of the nut 26 rotates against the bottom 29 of the insert flange 24 thereby providing a metal to metal seat. As the shank threads are taken up by continually turning the nut 26 thereon, the conically shaped grommet compresses and assumes the shape of the annular space between the sleeve 23 and the cylindrical walls of the mounting hole 18. The grommet top 30 rides against the bottom 15 of the washer 13 to form a firm resilient seal, while metal sleeve top 31 rises within the washer opening 27 and seats against the metal flange bottom 14. It is thus seen that a complete metal to metal locking assembly has been provided with iintermediate compressed resilient members associated for sealing arrangement.

Although I have described my invention with a certain degree of particularity, it is understood that the present disclosure has been made only by way of example and that numerous changes in the details of construction and combination and arrangement of parts may be resorted to without departing from the spirit and scope of the invention as hereinafter claimed.

What is claimed is:

In an anti-wobble assembly for mounting a toilet seat upon a non-resilient toilet bowl provided with mounting openings, the combination of a non-resilient flange positioned above the said opening,
    said flange carrying accessory mounting equipment and
    said flange having a flat lower surface;

a threaded stud depending from the said flange and being concentric therewith,
    said stud being positioned to pass downwardly through the said opening,
    said stud being of sufficient length to extend through the said opening;

a resilient washer disposed between the said non-resilient bowl and the said flange,
    said washer being of sufficient size to prevent contact between the flange and the bowl;

a hollow, resilient grommet riding upon the said stud said grommet including a circular bottom flange and a conical body portion rising above the bottom flange,
    said body portion serving to concentrically position the said stud within the said opening and also serving to insulate the stud from the bowl itself, a metallic, cylindrical sleeve carried by the said stud,
    said sleeve being of a diameter to snugly fit within the said grommet,
    said sleeve terminating downwardly in a concentric, circular flange,
    said sleeve being constructed to a height equal to the height of the opening plus the compressed height of the said washer plus the compressed height of the said bottom flange of the grommet,
    the top of the said sleeve flange contacting the bottom of the said grommet flange; and a bottom nut threadedly engaged upon the said stud,
    said nut serving to compress the grommet flange, the grommet body and the washer together by urging the cylindrical sleeve against the bottom of the said non-resilient flange, whereby the said resilient components combine to completely insulate the non-resilient members from contact with the said bowl.

References Cited by the Examiner
UNITED STATES PATENTS

| | | | |
|---|---|---|---|
| 2,828,095 | 3/1958 | Beck et al. | 85—70 |
| 2,846,697 | 8/1958 | Phillips | 4—240 |
| 3,013,643 | 12/1961 | Perry | 85—70 |

CARL W. TOMLIN, *Primary Examiner.*

R. S. BRITTS, *Assistant Examiner.*